(12) United States Patent
Okada (10) Patent No.: US 10,094,992 B2
(45) Date of Patent: Oct. 9, 2018

(54) OPTICAL MODULE WITH WAVELENGTH DIVIDING FILTER PASSIVELY ALIGNED WITH RESPECT TO HOUSING

(71) Applicant: SUMITOMO ELECTRIC DEVICE INNOVATIONS, INC., Yokohama-shi (JP)

(72) Inventor: Takeshi Okada, Yokohama (JP)

(73) Assignee: SUMITOMO ELECTRIC DEVICE INNOVATIONS, INC., Yokohama-shi (JP)

( * ) Notice: Subject to any disclaimer, the term of this patent is extended or adjusted under 35 U.S.C. 154(b) by 0 days.

(21) Appl. No.: 15/552,720

(22) PCT Filed: Feb. 23, 2016

(86) PCT No.: PCT/JP2016/055136
§ 371 (c)(1),
(2) Date: Aug. 22, 2017

(87) PCT Pub. No.: WO2016/136693
PCT Pub. Date: Sep. 1, 2016

(65) Prior Publication Data
US 2018/0031787 A1     Feb. 1, 2018

(30) Foreign Application Priority Data
Feb. 23, 2015    (JP) ................... 2015-032460

(51) Int. Cl.
*G02B 6/28*     (2006.01)
*G02B 6/42*     (2006.01)
*G02B 7/00*     (2006.01)

(52) U.S. Cl.
CPC ......... *G02B 6/4244* (2013.01); *G02B 6/4208* (2013.01); *G02B 6/4214* (2013.01);
(Continued)

(58) Field of Classification Search
CPC ............................ G02B 6/4244; G02B 6/4208
See application file for complete search history.

(56) References Cited

U.S. PATENT DOCUMENTS 5,552,918 A * 9/1996  Krug .................... G02B 6/4207
                                                        385/33
6,493,121 B1 * 12/2002 Althaus ................ G02B 6/4246
                                                        398/135
(Continued)

FOREIGN PATENT DOCUMENTS

JP    H11-064687 A    3/1999
JP    2005-202156 A   7/2005
(Continued)

*Primary Examiner* — Sung Pak
(74) *Attorney, Agent, or Firm* — Venable LLP; Michael A. Sartori; Laura G. Remus (57) ABSTRACT

An optical module that communicates with a single optical fiber is disclosed. The optical module includes an optical transmitting unit (Tx unit), an optical receiving unit (Rx unit), a filter holder that mounts a wavelength splitting filter, and a housing that installs the Tx unit, the Rx unit and the filter holder. The housing and the filter holder each provide slopes rubbing to each other that automatically determine the angle of the wavelength splitting filter.

10 Claims, 6 Drawing Sheets

(52) U.S. Cl.
CPC ......... *G02B 6/4215* (2013.01); *G02B 6/4246* (2013.01); *G02B 6/4295* (2013.01); *G02B 7/006* (2013.01)

(56) References Cited

U.S. PATENT DOCUMENTS

| | | | | |
|---|---|---|---|---|
| 6,652,158 | B2 * | 11/2003 | Bartur | G02B 6/4202 385/88 |
| 7,125,174 | B2 * | 10/2006 | Lo | G02B 6/4219 385/92 |
| 2004/0218857 | A1 * | 11/2004 | Hung | G02B 6/4246 385/31 |
| 2005/0157988 | A1 | 7/2005 | Lo et al. | |
| 2006/0280411 | A1 | 12/2006 | Nishizawa et al. | |
| 2011/0311229 | A1 | 12/2011 | Kondo et al. | |
| 2013/0294726 | A1 * | 11/2013 | Okada | G02B 6/4206 385/33 |

FOREIGN PATENT DOCUMENTS

| | | |
|---|---|---|
| JP | 2006-351608 A | 12/2006 |
| JP | 2012-168240 A | 9/2012 |
| WO | 2010/140186 A1 | 12/2010 |

\* cited by examiner

OPTICAL MODULE WITH WAVELENGTH DIVIDING FILTER PASSIVELY ALIGNED WITH RESPECT TO HOUSING

TECHNICAL FIELD

The present invention relates to an optical module, in particular, the invention relates to an optical module for an optical communication system, which transmits and/or receives optical signals each having wavelengths different from each other from/to a single optical fiber.

BACKGROUND

A single fiber bi-directional optical module that enables to transmit an upstream optical signal and receive a downstream optical signal with respect to the single fiber has been known as an optical module for an optical communication system. The single fiber bi-directional optical module provides an optical transmitting unit, an optical receiving unit, a fiber securing unit, a housing that assembles the optical transmitting unit, the optical receiving unit, and the fiber securing unit therewith, and a splitting filter that splits an optical signal subject to the optical transmitting unit from another optical signal subject to the optical receiving unit. The housing of the optical module installs the filter holder that secures the splitting filter therein. The filter holder provides a filter mounting surface, which makes an angle of about 45° with respect to an optical axis of the fiber securing unit, that of the optical transmitting unit, and that of the optical receiving unit, on which the splitting filter is mounted.

The optical module thus described provides no mechanism to determine a rotational angle of the filter holder with respect to the housing; accordingly, the filter holder is optionally rotatable. When the filter holder rotates, the wavelength splitting filter mounted on the filter mounting surface deviates the angle thereof with respect to the optical axes from the designed angles, which degrades not only the splitting function of the splitting filter but the optical coupling efficiencies between the optical fiber and the optical units.

The present invention provides an optical module, which transmits and receives optical signals having wavelengths different from each other to and from a single optical fiber, and provides a wavelength splitting filter that splits the optical signals, may assemble those optical components including the optical fiber without carrying out the optical alignment against the housing that installs the wavelength splitting filter therein.

SUMMARY OF INVENTION

One aspect of the present invention relates to an optical module that communicates a first optical signal having a first wavelength and a second optical signal having a second wavelength concurrently with a single fiber. The optical module includes a first optical unit, a second optical unit, a wavelength splitting filter, a filter holder, and a housing. The first optical unit is coupled with the first optical signal along the first optical axis. The second optical unit is coupled with the second optical signal along the second optical axis perpendicular to the first optical axis. The wavelength splitting filter reflects one of the first optical signal and the second optical signal, and transmits another of the first optical signal and the second optical signal. The filter holder holds the wavelength splitting filter. The housing installs the filter holder therein and attaches the first optical unit and the second optical unit thereto. A feature of the present optical module is that the filter holder is fit with the housing.

BRIEF DESCRIPTION OF DRAWINGS

FIG. 5 is a perspective view of a filter holder that secures the wavelength splitting filter, where FIG. 5A views the filter holder from a mounting surface that mounts the wavelength splitting filter, while, FIG. 5B views the filter holder from a side opposite to the former one.

DESCRIPTION OF EMBODIMENT

Next, as referring to drawings, preferable embodiment according to the present invention will be described. However, the present invention could not be restricted to those examples and is directed to encompass those defined in claims and all modifications within the claims and equivalent thereto. Also, in the description of the drawings, numerals or symbols same with or similar to each other will refer to elements same with or similar to each other without duplicating explanations.

Figure 1:
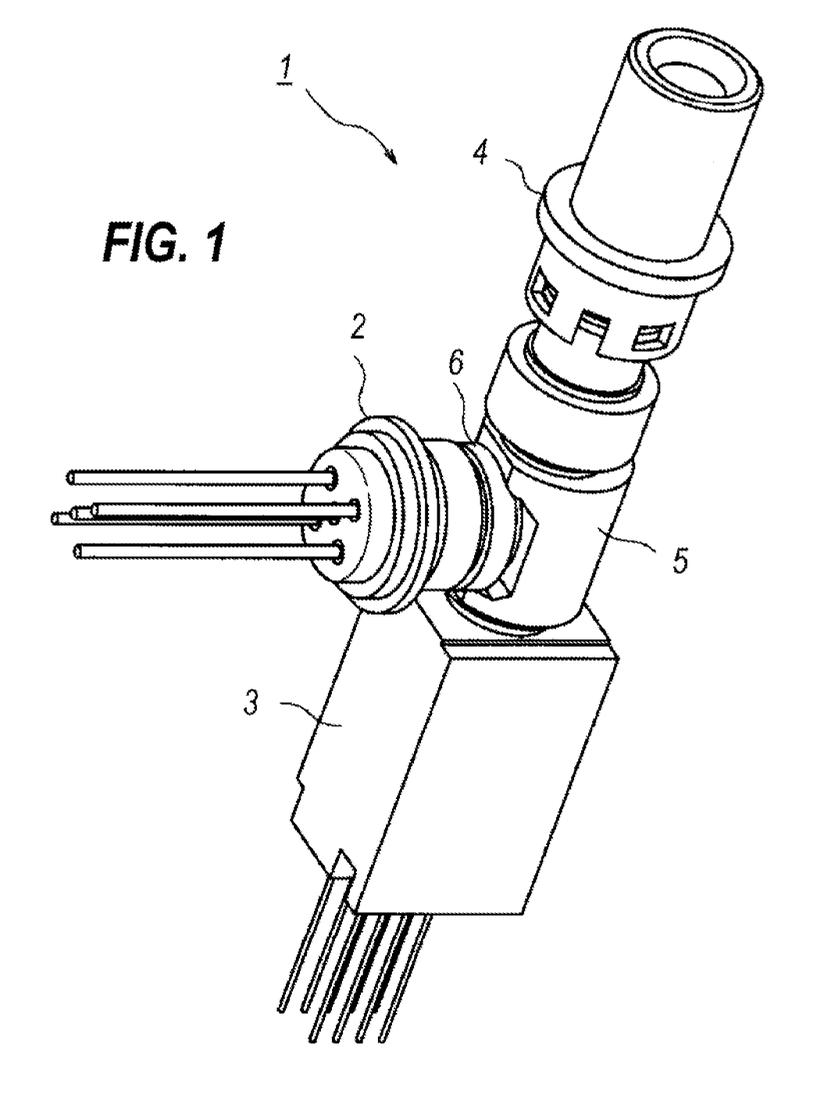
FIG. 1 is a perspective view showing an optical module according to embodiment of the present invention.
Figure 2:
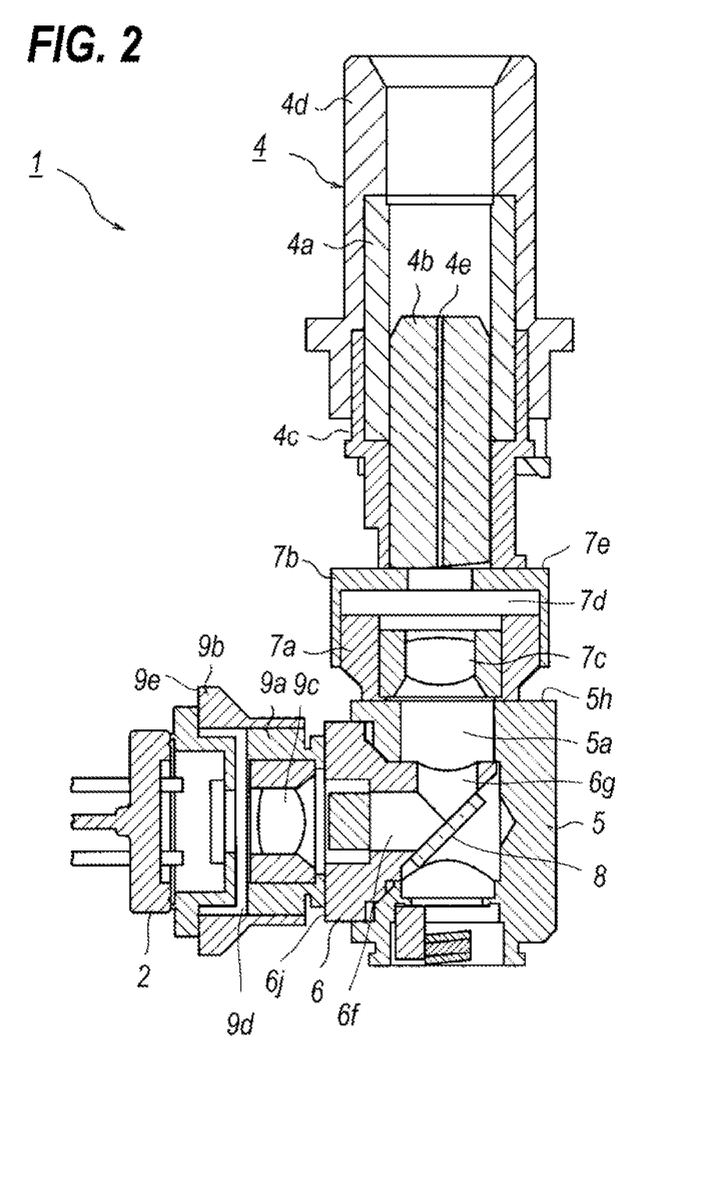
FIG. 2 shows a cross section of the optical module shown in FIG. 1.

FIG. 1 is a perspective view of an optical module according to embodiment of the present invention, and FIG. 2 shows a cross section of primary portions of the optical module shown in FIG. 1. The optical module 1 shown in FIGS. 1 and 2 is a type of, what is called, bi-directional optical module capable of communicating with a single fiber. That is, the optical module 1 may receive a receiving optical signal (Rx light) form the single fiber concurrently with a transmission of a transmitting optical signal (Tx light) to the single fiber. The optical module 1 includes an optical receiving unit (Rx unit) 2, an optical transmitting unit (Tx unit) 3, and a coupling unit 4 that receives the single fiber therein. The optical module 1 further provides a housing 5, to which the Rx unit 2, the Tx unit 3, and the coupling unit 4 are attached, and a filter holder 6 that installs a wavelength splitting filter 8. The optical module 1 of the present embodiment attaches the Rx unit 2 to the housing 5 through the filter holder 6.

The Rx unit 2, which is the second optical unit in the present invention, installs a photodiode (PD) that receives the Rx light from the single fiber; while the Tx unit 3, which is the first optical unit in the present invention, installs a laser diode (LD) that transmits the Tx light to the single fiber. The Tx unit 3 is attached to the housing 3 such that an optical axis thereof becomes parallel to the coupling unit 4; while the Rx unit 2 is attached to the housing 5 through the filter holder 6 such that an optical axis thereof makes an angle of 90° with respect to the optical axis of the coupling unit 4. That is, the optical axis of the Tx unit 3 and the optical axis of the Rx unit 2 intersect on the wavelength splitting filter 8 as making an angle of substantially 90°. The Tx unit 3 shown in FIG. 1 provides a box-shape package, which is called as a butterfly package, but the Tx unit 3 may have a package with a co-axial type same with the Rx unit 2.

The coupling unit 4, as FIG. 2 illustrates, includes a sleeve 4a, a stub 4b, a bush 4c, and the sleeve cover 4d. The sleeve 4a receives an optical ferrule secured in a tip of the single fiber. The stub 4b in a front portion thereof is secured in a rear portion of the sleeve 4a. The bush 4c in a rear portion thereof secures the rear portion of the stub 4b; while the front portion of the bush 4c is inserted between the sleeve cover 4d and the rear portion of the sleeve 4a. That is, the sleeve 4a in the rear portion thereof is inserted within a gap between the front portion of the bush 4c and the front portion of the stub 4b. The insertion of the rear portion of the sleeve 4a and that of the front portion of the bush 4c may be carried out by press-fitting. The present specification assumes that "front" corresponds to a side where the coupling unit 4 is attached to the housing 5; while "rear" corresponds to a side where the Tx unit 3 is attached to the housing 5. However, those assumptions are merely for the explanation sake, and could not affect the scope of the invention. Inserting the optical ferrule of the single fiber into the sleeve 4a and abutting the tip of the optical ferrule against the front end of the stub 4b, which makes the single fiber in physical contact with the coupling fiber 4e secured in a center of the stub 4b without forming Fresnel interfaces, the single fiber may optically couple with the Rx unit 2 and the Tx unit 3.

A forward alignment unit 7 includes a front lens holder 7a, which secures a front lens 7c. The front lens holder 7a and the front coupling sleeve 7b each have a cylindrical shape. That is, the front lens holder 7a secures the front lens 7c within a bore thereof; while, the front coupling sleeve 7b secures the front lens holder 7a within a bore 7d thereof. Adjusting an overlapping length between the front lens holder 7a and the front coupling sleeve 7b, an optical alignment of the forward alignment unit 7 along the optical axis thereof may be carried out. On the other hand, sliding a rear end of the coupling unit 4 on a front wall 7e of the forward coupling sleeve 7b, the optical alignment in a plane perpendicular to the optical axis of the coupling unit 4 may be carried out between the coupling unit 4 and the housing 5. After performing those optical alignments, a pierce welding may fix the front coupling sleeve 7b with the front lens holder 7a and the fillet welding may fix the coupling unit 4 with the front coupling sleeve 7b.

The latter alignment, that is, the alignment along the X and Y directions within a plane perpendicular to the optical axis, investigates a point at which the magnitude detected through the coupling fiber 4e becomes a maximum. The coupling unit 4 is fixed to the front coupling sleeve 7b thereat. On the other hand, the other alignment, that is, the alignment along the Z direction parallel to the optical axis, may adjust relative positions between the front lens holder 7a and the front coupling sleeve 7b at which the magnitude detected through the coupling fiber 4e becomes a preset value, because a maximum magnitude possibly exceeds a limit determined by the eye safety.

In the optical module 1, the Tx light output from the Tx unit 3 reaches the coupling fiber 4e passing the wavelength splitting filter 8 and the front lens 7c; while, the Rx light output from the coupling fiber 4e reaches the Rx unit 2 passing the front lens 7c and reflected by the wavelength splitting filter 8.

Figure 3:
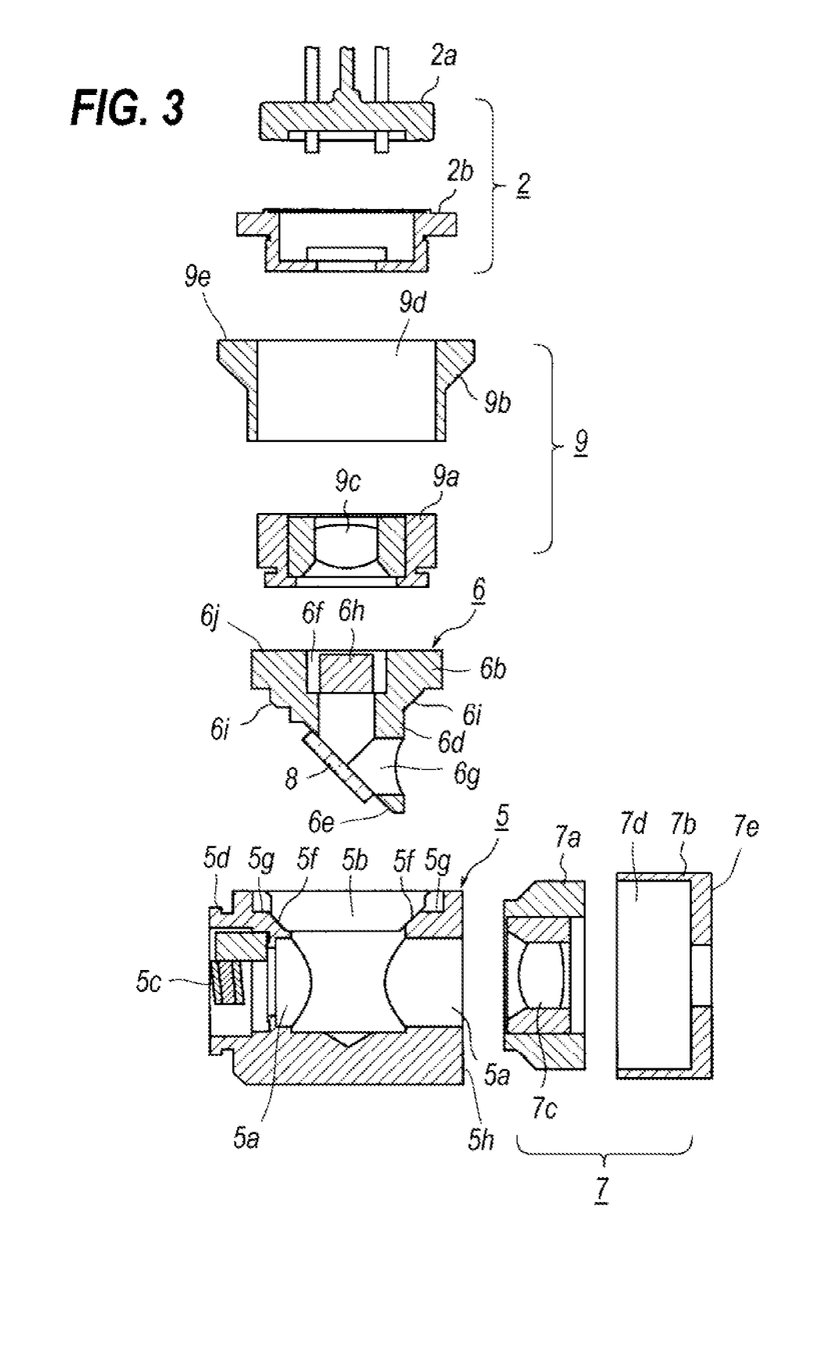
FIG. 3 is an exploded cross section of a primary part of the optical module shown in FIG. 1.
Figure 4:
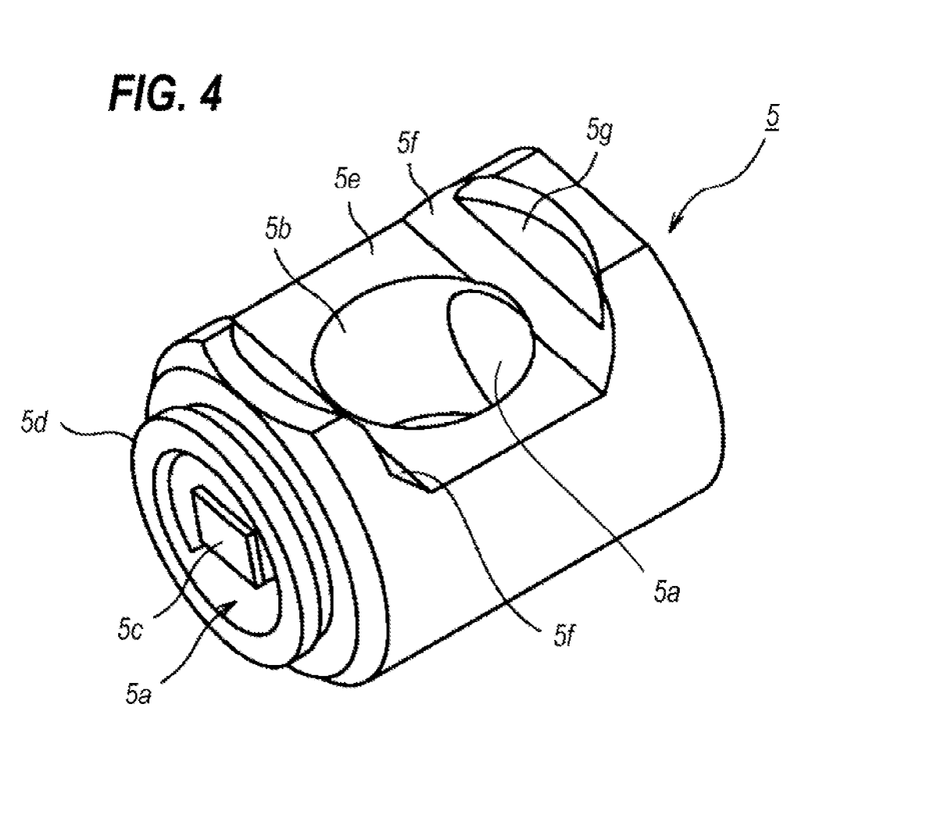
FIG. 4 is a perspective view showing a housing.
Figure 5A:
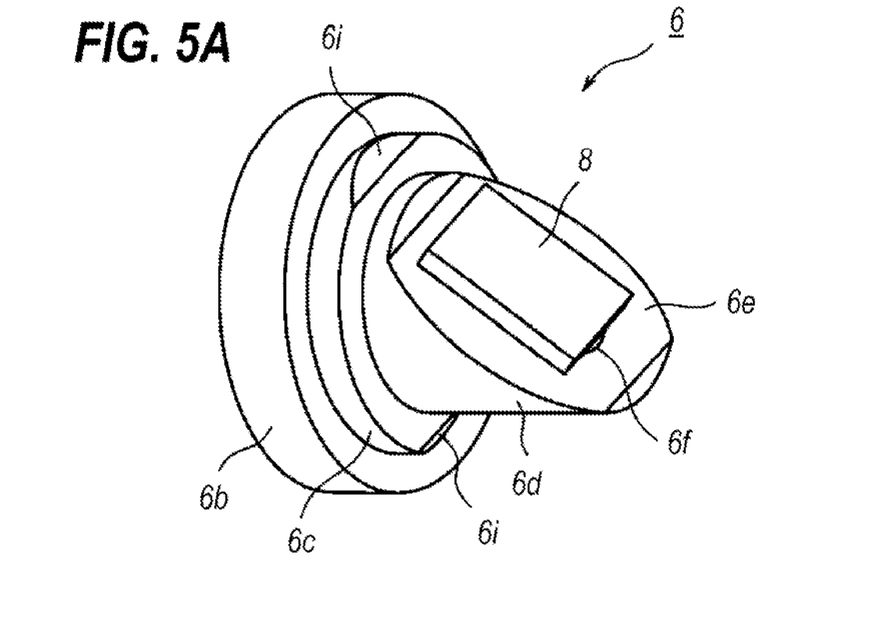
Figure 5B:
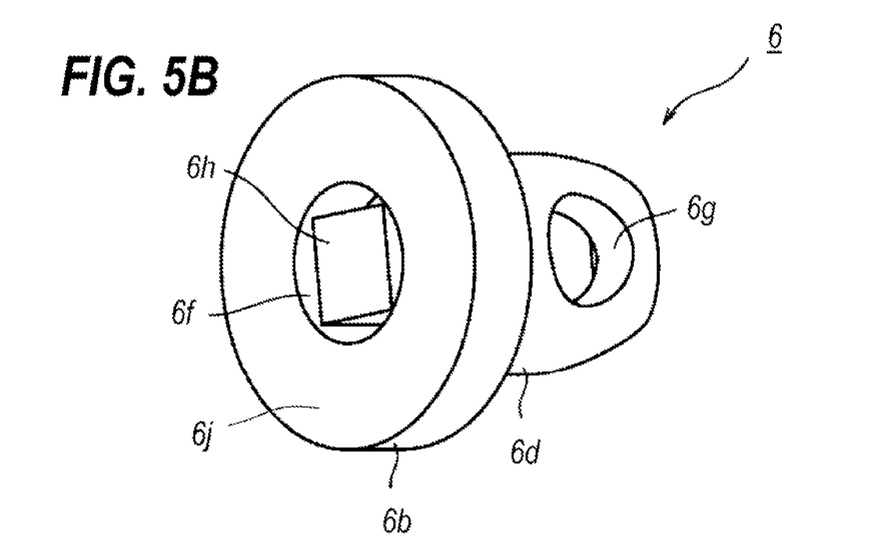

FIG. 3 is an exploded view of a primary portion of the optical module 1 illustrated by respective cross sections, FIG. 4 is a perspective view of the housing 5, FIGS. 5A and 5B are perspective views of the filter holder 6, where FIG. 5A views the filter holder 6 from a side of the wavelength splitting filter 8, while, FIG. 5B views from a side of the Tx unit 3. The housing 5, which may be made of metal and have a cylindrical shape, provides a first bore 5a, which is denoted as a Tx bore, with an axis thereof parallel to the optical axis of the Tx unit 3, and a second bore 5b, which is denoted as an Rx bore, with an axis thereof parallel to the optical axis of the Rx unit 2. The Tx bore 5a extends from an end 5h, to which the coupling unit 4 is to be attached, to another end to which the Tx unit 3 is to be attached. The Tx bore 5a also secures an isolator 5c between the wavelength splitting filter 8 and the end to which the Tx unit 3 is attached. The Tx unit 3 is fixed to the flange 5d of the housing 5 by the fillet welding.

One of features of the housing 5 according to the present invention is that the Rx bore 5b is pierced from the flat surface 5e in an outer surface of the housing 5, and the flat surface 5e continues steps 5g interposing slopes 5f therebetween. The slopes 5f exist along the optical axis of the coupling fiber 4e, namely, along the optical axis of the Tx unit 3, in other words, the slopes 5f are formed so as to sandwich the Rx bore 5b and the steps 5g are formed outside of the respective slopes 5f. As described later in the specification, the filter holder 6 also provides a slope 6i that fits with the slope 5f of the housing 5. Relative relations between the two slopes, 5f and 6i, may prevent the filter holder 6 from rotating within the Rx bore 5b, and passively determines an insertion depth of the filter holder 6 within the Rx bore 5b.

The filter holder 6, which may be made of metal, provides the flange 6b and a pillar 6d protruding from the flange 6b. Specifically, the flange 6b has a circular step 6c and the pillar protrudes from the step 6c. The flange 6b, the circular step 6c, and the pillar 6d in plane views thereof are formed in a concentric circle. The pillar 6d provides a mounting surface 6e in an end thereof, where the mounting surface 6e mounts the wavelength splitting filter 8 thereon. The filter holder 6 also provides a first bore, namely the Tx bore 6g, in an intermediate of the pillar 6d and a second bore, namely, the Rx bore 6f, piercing in the flange 6b and the pillar 6d. The Tx bore 6g intersects the Rx bore 6f with an angle of 90° at a virtual point extending the mounting surface 6e. That is, the axis of the Tx bore 6g intersects the axis of the Rx bore 6f by the angle of 90° on the surface of the wavelength splitting filter 8 placed on the mounting surface 6e. The filter holder 6 also provides the slopes 6i in respective points that face the pillar 6d on the circular step 6c and along the optical axis of the coupling unit 4, or the optical axis of the Tx unit 3.

Referring to FIG. 3, the Rx bore 6f provides a step on which a receiving filter 6h is mounted thereon. The receiving filter 6h may cut light coming from the Tx unit 3. The optical module 1 according to the present embodiment assumes to be installed in a system where the wavelength $\lambda_{Tx}$ of the Tx light and that $\lambda_{Rx}$ of the Rx light have a relation of $\lambda_{Tx} < \lambda_{Rx}$. Accordingly, the Tx unit 3 is not affected from the Rx light. That is, an LD implemented within the Tx unit becomes transparent for the Rx light. However, the Rx unit 2 is influenced from the Tx light. Specifically, a PD implemented within the Rx unit 2 is affected by the Tx light. In particular, when signal light generated by the Tx unit 3 is once output externally from the optical module 1 passing the wavelength splitting filter 8, caused by the Fresnel reflection at a point far from the optical module 1 and returns back to the optical module 1, portion of light possibly reaches the Rx unit 2 reflected by the wavelength splitting filter 8. Such light becomes noises for the Rx unit 2. Accordingly, the receiving filter 6h is preferably interposed in front of the Rx unit 2 so as to transmit light subject to the Rx unit 2 and reflect rest light.

Figure 6:
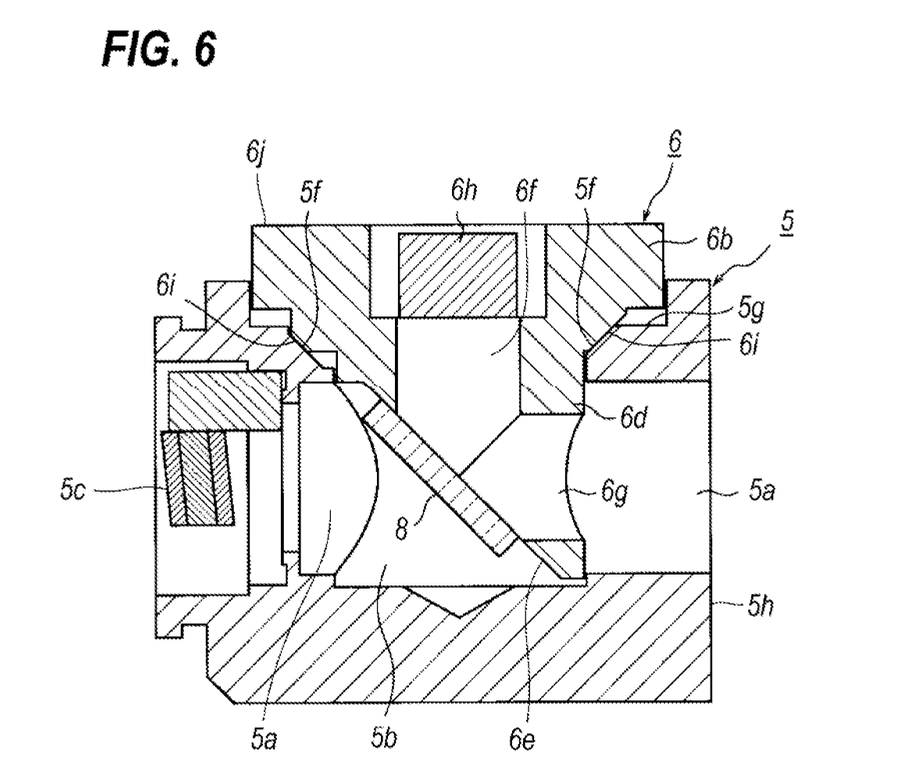
FIG. 6 shows a cross section of the filter holder installed within the housing.

FIG. 6 shows a cross section of the filter holder 6 assembled within the housing 5. The coupling unit 4, the Tx unit 3, and the Rx unit 2 are attached to the end 5h, the end opposite to the end 5h, and the surface 6j of the filter holder 6, respectively. The pillar 6d is inserted within the Rx bore 5b of the housing 5. The axis of the Tx bore 5a of the housing 5 coincides with the axis of the filter holder 6, exactly, the center axis of the Tx bore 6g in the pillar 6d, and intersects the axis of the Rx bore 6f in the pillar 6d at a point on the plane virtually extending the mounting surface 6e and in a center of the housing 5.

For the slope 6i of the filter holder 6, the pillar 6d of the filter holder 6 is inserted into a deep end of the Rx bore 5b as forming a gap between the step 6c of the filter holder 6 and the flat surface 5e of the housing, and between the flange 6b and the step 5g of the housing 5. That is, the filter holder 6 and the housing 5 are in contact only at the slopes, 5f and 6i, respectively.

In other words, rubbing the slope 6i of the filter holder 6 against the slope 5f of the housing 5, the normal of the wavelength splitting filter 8 mounted within the filter holder 6 is determined in an angles against the optical axis of the Rx unit 2 and that of the Tx unit 3, and never deviates from thus determined positional relations. The Rx light provided from the coupling unit 4 is reflected by the wavelength splitting unit 8 and enters the Rx unit 2 by an appropriate incident angle. Or, the Rx light is guided in an area within which at least the Rx unit 2 is able to be aligned by sliding the Rx unit 2 on the surface 6j of the filter holder 6. Also, the Tx light coming from the Tx unit 3 appropriately guides to the coupling unit 4, exactly, the end of the coupling fiber.

When the incident angle for the wavelength splitting filter 8 deviates from the designed one; the wavelength splitting filter 8 degrades the wavelength splitting function for the two beams. In an optical system where the optical axes of the Rx unit 2 and the Tx unit 3 make a right angle at the wavelength splitting filter 8, and in order to distinguish the beam with the wavelength of for instance, 1.48 µm from the beam with the wavelength of 1.55 µm; the optical system requires deviation of the incident angle of the two beams to be within ±1°. In such a case, the deviation of the mounting angle of the wavelength splitting filter 8 is necessary to be within ±0.5°. When the angle for the wavelength splitting filter 8 is deviated, which means that the beam incident angle to the receiving filter 6h deviates from the designed angle, the wavelength filtering performance of the receiving filter 6h is also degraded.

The wavelength splitting filter 8 may be generally made of multi-layered optical thin films on a mother material, where optical thin films each have optical characteristics, in particular, refractive index thereof different from each other. Although steepness of wavelength splitting function depends on a count of the optical thin films; an increased count decreases transmittance of the wavelength splitting filter 8. Also, a wavelength splitting filter with a steep cut-off characteristic requires absolute accuracy in a center wavelength, or a cut-off wavelength. The filter holder 6 and the housing 5 of the present invention have the slopes, 6i and 5f, that may automatically determine the angle of the wavelength splitting filter 8 against the optical axes of the Rx unit 2 and the Tx unit 3; this arrangement may be applicable to a wavelength splitting filter with the multi-layered optical thin films.

The description above concentrates the optical module 1 that provides one optical receiving unit and one optical transmitting unit; but the optical module 1 may provide another optical transmitting unit instead of the optical receiving unit. In such an optical module, a difference in wavelengths for the respective optical transmitting units becomes further narrower and a wavelength splitting filter configured with a multi-layered optical thin films could not distinguish two wavelengths. Making a polarization of one of the Tx light perpendicular to a polarization of another of the Tx light, a wavelength splitting filter has a substantial wavelength distinguishing function. Such a polarization distinguishing function requires further accuracy in the incident angles of two beams with respect to the normal of the wavelength splitting filter.

Next, an assembly including the optical alignment between the external fiber and the Rx unit 2 and between the external fiber and the Tx unit 3 will be described. The process first assembles the filter holder 6 so as to mount the wavelength splitting filter 8 onto the surface 6e in the end of the pillar 6d. As already described, the filter holder 6 and the housing 5 provide the respective slopes, 6i and 5f. Rubbing the slope 6i against the slope 5f, and welding the flange 6b of the filter holder 6 with the housing 5; the filter holder 6 is assembled with the housing 2. In step of assembling the filter holder 6, no optical alignment is carried out. After the fixation of the filter holder 6 to the housing 5, the Tx unit 3 in the front end thereof is fixed to the flange 5g of the housing at a designed position without carrying out the optical alignment.

Thereafter, the forward alignment unit 7 is fixed to the housing 5, and the coupling unit 4 is fixed to the forward alignment unit 7. Specifically, practically operating the Tx unit 3, exactly, generating a laser beam from an LD implemented within the Tx unit 3, the laser beam is guided within the housing 5. The coupling unit 4 and the forward alignment unit 7 are aligned for the laser beam, and fixed at the aligned position on the front end 5h of the housing 5. The present step positions the coupling unit 4 against the housing 5 interposing the forward alignment unit 7. That is, the present step prepares a dummy fiber, movable together with the front lens holder 7a and having an end surface locating at a focal point of the front lens 7c. Sliding the front lens holder 7a on the front surface 5h of the housing 5, the process fixes the front lens holder 7a at a position where the magnitude of the Tx light detected through the dummy fiber becomes a maximum.

Next, removing the dummy fiber and covering the front lens holder 7a with the front coupling sleeve 7b, sliding the coupling unit 4 on the front surface 7e of the front coupling sleeve 7b in the plane perpendicular to the optical axis, the coupling unit 4 is temporarily fixed at a position where the magnitude of the Tx light detected through the coupling unit 4 becomes a maximum. Thereafter, the penetration depth of the front coupling sleeve 7b into the front lens holder 7a is adjusted. An overlapping length between two members may be adjusted such that, practically operating the LD implemented within the Tx unit 3, the magnitude detected through the coupling unit 4 becomes within a predetermined range, and the pierce welding may fix the front coupling sleeve 7b with the front lens holder 7a. The alignment of the front coupling sleeve 7b against the front lens holder 7a does not always set the end of the coupling fiber 4 at a focal portion of the front lens 7c. The end of the coupling fiber 4e coincident with the focal point of the front lens 7c possibly causes the magnitude of the light output through the coupling fiber exceeding the limit of the eye-safety. Accordingly, the end of the coupling fiber 4e is usually offset from the focal point of the front lens 7c, namely, a de-focused arrangement. Finally, the alignment of the coupling unit 4 in a plane perpendicular to the optical axis thereof is carried out on the end surface 7e of the front coupling sleeve 7b. The fillet welding may fix the coupling unit 4 with the front coupling sleeve 7b at the aligned position.

Then, the process aligns the Rx unit 2 with respect to the housing 5, exactly, the filter holder 6 and fixes thereto. Specifically, the rear lens holder 9a is fixed to the surface 6j of the filter holder 6 without performing the active alignment. That is, the fillet welding fixes the rear lens holder 9a to a designed position of the filter holder 6. Then, a penetration depth of the rear lens holder 9a into the bore 9d of the rear coupling sleeve 9b is first adjusted. Co-operating the Rx unit 2 with the rear coupling sleeve 9b and practically providing dummy Rx light from the coupling fiber 4, the alignment of the Rx unit 2 with respect to the rear coupling sleeve 9b may be carried out as practically receiving the dummy Rx light by the PD implemented within the Rx unit 2. Because the wavelength splitting filter 8 already determines the angle thereof, the dummy Rx light enters the Rx unit 2 without aligning the Rx unit 2 in a plane perpendicular to the optical axis thereof. Or, the dummy Rx light may enter the PD in the Rx unit 2 with a magnitude substantial to carry out the alignment parallel to the optical axis thereof. Then, the penetration depth of the rear lens holder 9a into the rear coupling sleeve 9b may be determined such that the magnitude detected by the PD becomes a maximum. The pierce welding may fix the rear coupling sleeve 9b with the rear lens holder 9a at that position. The Rx unit 2 has an outer diameter slightly smaller than an inner diameter of the bore 9d of the rear coupling sleeve 9b so as to form a slight gap therebetween. The optical alignment may be carried out within this slight gap, and the fillet welding may fix the Rx unit 2 to the rear coupling sleeve 9b at a position where the magnitude detected by the PD becomes a maximum. During the alignment in the plane perpendicular to the optical axis thereof, the Rx unit 2 is not rotated. The Rx unit 2 provides some terminals to be fixed to the respective pads on a circuit board; accordingly, rotating the Rx unit 2, the positional relations between the terminals and the pads become out of order.

Embodiment according to the present invention is thus described but it would be obvious for an ordinal artisan to vary and/or modify the embodiment. Accordingly, claims presented below may imply those variations and modifications fallen within a true spirit and scope of the present invention.

The invention claimed is:

1. An optical module communicating a first optical signal having a first wavelength and a second optical signal having a second wavelength concurrently with a single optical fiber, the optical module comprising:
a first optical unit coupled with the first optical signal along a first optical axis;
a second optical unit coupled with the second optical signal along a second optical axis perpendicular to the first optical axis;
a wavelength splitting filter that reflects one of the first optical signal and the second optical signal, and transmits another of the first optical signal and the second optical signal;
a filter holder holding the wavelength splitting filter, the filter holder providing a flange and a pillar, the flange providing a pair of slopes sandwiching the pillar therebetween along the first optical axis; and
a housing that attaches the first optical unit and the second optical unit thereto, the housing providing a first bore extending along the first optical axis, a second bore extending along the second optical axis, and a pair of slopes that sandwich the second bore therebetween along the first optical axis, the second bore installing the filter holder therein,
wherein the pair of the slopes of the filter holder fit with the pair of the slopes of the housing, and the flange of the filter holder forms a gap against the housing.

2. The optical module of claim 1,
wherein the filter holder further provides a mounting surface,
wherein the pillar provides a first bore and a second bore, the first bore of the pillar piercing the pillar along the first optical axis and continuing the first bore of the housing, the second bore of the pillar extending in a center of the pillar along the second optical axis, the mounting surface mounting the wavelength splitting filter thereon, and
wherein the first bore of the pillar in an axis thereof intersects the second bore of the pillar in an axis thereof at the mounting surface.

3. The optical module of claim 2,
wherein the first optical axis intersects the second optical axis at the wavelength splitting filter mounted on the mounting surface.

4. The optical module of claim 1,
wherein the housing provides a plane surface that exposes the second bore of the housing therein, and
wherein the pair of the slopes of the housing continue respective ends of the plane surface along the first optical axis.

5. The optical module of claim 4,
wherein the housing further provides steps continuous to the respective slopes of the housing in outer sides with respect to the second bore of the housing.

6. The optical module of claim 1,
further including a coupling unit and a forward alignment unit that includes a front lens holder and a front coupling sleeve,
wherein the coupling unit receives an optical fiber with an optical axis parallel to the first optical axis and is assembled with the housing through the forward alignment unit, and
wherein the front coupling sleeve provides a bore that receives the front lens holder.

7. The optical module of claim 1,
further including a rear alignment unit that includes a rear lens holder and a rear coupling sleeve,
wherein the rear lens holder secures a rear lens therein, the rear coupling sleeve having a bore that receives the rear lens holder therein.

8. The optical module of claim 1,
wherein the wavelength splitting filter has a normal making an angle of 45° against the first optical axis and against the second optical axis.

9. The optical module of claim 1,
wherein the first optical unit is an optical transmitting unit having a semiconductor laser diode (LD) that emits the first optical signal to the wavelength splitting filter, and
wherein the second optical unit is an optical receiving unit having a photodiode (PD) that receives the second optical signal from the wavelength splitting filter.

10. The optical module of claim 9,
further providing an optical isolator in the first bore of the housing between the wavelength splitting filter and an end of the housing to which the first optical unit is attached.

* * * * *